(12) United States Patent
Liang et al.

(10) Patent No.: US 7,881,386 B2
(45) Date of Patent: Feb. 1, 2011

(54) METHODS AND APPARATUS FOR PERFORMING FAST MODE DECISIONS IN VIDEO CODECS

(75) Inventors: Yi Liang, San Diego, CA (US); Khaled Helmi El-Maleh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1187 days.

(21) Appl. No.: 10/957,512

(22) Filed: Sep. 30, 2004

(65) Prior Publication Data

US 2005/0201627 A1   Sep. 15, 2005

Related U.S. Application Data

(60) Provisional application No. 60/552,156, filed on Mar. 11, 2004.

(51) Int. Cl.
*H04N 7/12* (2006.01)
(52) U.S. Cl. .................... 375/240.24; 375/240.12; 375/240.16; 375/240.18; 375/240.13; 348/416; 348/415.1; 348/412.1
(58) Field of Classification Search ............ 375/240.24, 375/240.12, 240.16, 240.18, 240.13; 348/416, 348/415.1, 412.1
See application file for complete search history.

(56) References Cited

U.S. PATENT DOCUMENTS

| 5,731,835 | A | * | 3/1998 | Kuchibholta | ............. 348/390.1 |
| 6,697,430 | B1 | * | 2/2004 | Yasunari et al. | ........ 375/240.13 |
| 7,257,262 | B2 | * | 8/2007 | Yamamoto et al. | .......... 382/236 |
| 2006/0193385 | A1 | * | 8/2006 | Yin et al. | ................ 375/240.12 |

FOREIGN PATENT DOCUMENTS

| JP | 07131793 | 5/2005 |
| WO | 2005004491 | 1/2005 |

OTHER PUBLICATIONS

Yin, et al. Fast Mode Decision and Motion Estimation for JVT/H. 264. IEEE. 2003. pp. 853-856.
Meng, et al. Fast Intra-Prediction Mode Selection for 4x4 Blocks in H.264. IEEE. 2003. pp. 389392.
Ahmad, et al. Selection of Variable Block Sizes in H.264. IEEE. 2004. pp. 173-176.

* cited by examiner

*Primary Examiner*—Tung Vo
*Assistant Examiner*—Anner Holder

(57) ABSTRACT

Methods and apparatus are presented for reducing the computational complexity of coding mode decisions by exploiting the correlations across spatially and/or temporally close coding mode decisions. A mode decision for a current macroblock is based on the mode decisions of spatially and/or temporarily close macroblocks.

37 Claims, 6 Drawing Sheets

Frame t-1

Frame t

○ Post-mode decision
✕ Pre-mode decision

METHODS AND APPARATUS FOR PERFORMING FAST MODE DECISIONS IN VIDEO CODECS

CLAIM OF PRIORITY UNDER 35 U.S.C. §119

The present application for patent claims priority to Provisional Application No. 60/552,156 entitled Low-Complexity Intra/Inter Mode Decision for Video Coding filed Mar. 11, 2004, and assigned to the assignee hereof and hereby expressly incorporated by reference herein

BACKGROUND

1. Field

This invention relates generally to the field of digital image processing, and more specifically, to the field of video encoding and decoding.

2. Background

The transmission of video over communication channels, either wireless or wired, has become possible with developments that improve the data capacity of communication channels. Moreover, various standards have been established to facilitate the transmission and reception of video using electronic devices with digital storage media, such as mobile telephones, personal computers, personal digital assistants (PDAs), and other electronic devices. Examples of some video standards that enable the transmission of video images over communication channels are Moving Pictures Expert Group-1 (MPEG-1), MPEG-2, and MPEG-4, International Telecommunications Union (ITU) H.263, H.264, which were promulgated by the International Organization for Standardization (ISO). Another standards-forming body of note is the Audio Video Coding Standard Working Group of China (AVS).

In order to provide such video services, the original images must be compressed in a manner that will not exceed the data capacity of a communication channel. For example, in circuit-switched landline telephone systems, the communication channel is physically limited to 64 kbits/second. However, this bit rate is inadequate for the purpose of transmitting a video stream in its raw format with acceptable perceptual quality. However, the manner in which the compression is performed should not sacrifice the perceptual quality of images at a receiver.

In order to balance these two competing requirements, many video encoders use a transform coding technique combined with a motion compensation technique to compress the original video sequence. The transform coding technique is used to remove spatial redundancy while the motion compensation technique is used to remove temporal redundancy.

It is widely acknowledged by those of skill in the art that compression of original images using transform coding and motion compensation techniques is computationally intensive. The number of instructions needed to perform the compression, as measured in MIPS (million instructions per second), is substantial and may consume hardware resources that could otherwise be allocated to other applications. Since the compression is often expected to be performed within small, portable electronic devices, hardware resources to perform these compression techniques may be limited. Hence, there is a present need to reduce the MIPS or hardware requirements of video encoders without unduly degrading the perceived quality of the video image.

SUMMARY

Methods and apparatus are presented herein to address the above stated needs. In one aspect, a method is presented for making a coding mode decision for a current macroblock, the method comprising: evaluating a plurality of coding modes, each associated with a neighboring macroblock; and selecting the coding mode for the current macroblock based upon the evaluation of the plurality of coding modes.

In another aspect, apparatus is presented in a video codec for performing a mode decision for a current macroblock, the apparatus comprising: at least one memory element; and at least one processing element communicatively coupled to the at least memory element and configured to implement a set of instructions stored on the at least one memory element, the set of instructions for: evaluating a plurality of coding modes, each associated with a neighboring macroblock; and selecting the mode for the current macroblock based upon the evaluation of the plurality of coding modes.

DETAILED DESCRIPTION

The newer generation of video compression standards exploits a phenomenon of video in order to reduce the encoding complexity. Video is merely a series of still images, called frames, which run quickly and successively in time. It may be observed that some frames of video exhibit spatial similarity and correlation while some frames of video also exhibit temporal similarity with neighboring frames. Hence, most video compression standards perform different coding techniques for "Intra-coded frames," which are frames whose spatial redundancy is explored, and "Inter-coded frames," whose temporal redundancy is explored. Predictive coding is typically used for frames that contain either spatial or temporal redundancy. For illustrative ease, Intra-coded frames will be referred to herein as I-frames and Inter-coded frames will be referred to herein as P-frames. In order to encode I-frames and P-frames, a typical video codec will work upon macroblocks of an image frame, rather than the image frame in its entirety. Using standard size measurements from the Quarter Common Intermediate Format (QCIF), a block comprises an 8×8 group of pixels and a macroblock comprises a 16×16 group of pixels. A QCIF frame of 176×144 pixels has 99 macroblocks. For illustrative ease, the Intra-coded macroblocks will be referred to herein as "Intra-MB" and the macroblocks coded using motion compensation and temporal prediction will be referred to herein as "Inter-MB."

Figure 1A:
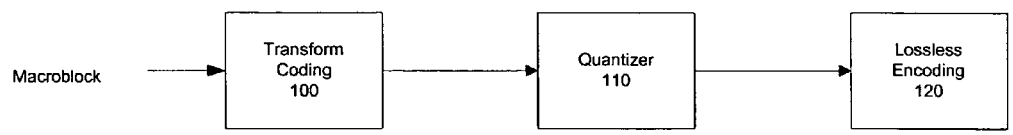
FIGS. 1A & 1B are flowcharts of conventional video compression schemes as used by a video encoder.

FIG. 1A is a flowchart illustrating Intra-coding. At step 100, the pixels within an Intra-MB undergo a transform coding. At step 110, the coefficients of the transform are then quantized. At step 120, the quantized coefficients are then losslessly encoded for transmission. Since the transform coding technique standardized in MPEG-4 is the Discrete Cosine Transform (DCT), the embodiments are described herein using the DCT. However, one of skill in the art would recognize that the embodiments are not limited to DCT, but can be utilized in video encoders using other transform coding techniques. The DCT is frequently chosen as the transform code for video coding standards since a high amount of energy can be packed in a relatively small number of coefficients.

The decoding of Intra-MBs involves a reversal of the process in FIG. 1A, in that received information is losslessly decoded, de-quantized, and then transformed using an inverse of the transform used at step 100.

The encoding process for Intra-MBs is relatively straightforward and not computationally intensive. Coding Intra-MBs requires a large number of bits, which requires a large amount of storage memory and transmission bandwidth. Hence, this encoding process consumes memory, rather than processor cycles. To encode the entire stream of video according to the method illustrated in FIG. 1A would be inefficient, since the transmission channel would be unable to carry the total number of bits required to convey multiple frames per second.

In contrast to I-frames, P-frames further explore and reduce temporal redundancy from frame to frame, which can be used along with spatial redundancy reduction to predictively reduce the number of bits that needs to be stored in memory. In a video recording of low motion activity, the difference in pixels between one frame and the next is small if the motion between the two frames is compensated. Since there is little or no motion after motion compensation, it is possible to use information about a previous and/or future frame to predict what the current frame will show. Rather than encode and transmit all the bits of the current frame, the residual of a prediction of what the current frame may contain is encoded and transmitted, which reduces the number of bits that need to be stored or transmitted. However, the encoding of P-frames is computationally expensive due to the number of estimation calculations that are needed to estimate the motion.

Figure 1B:
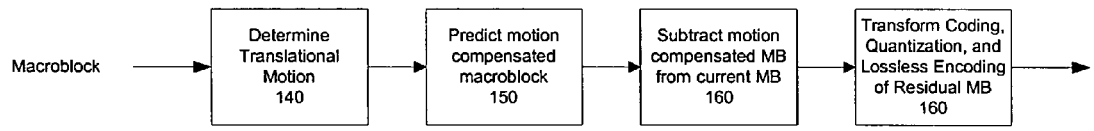

FIG. 1B is a flowchart illustrating the encoding of Inter-MBs. At step 140, the translational motion between blocks of pixels within a P-frame is determined using motion estimation techniques. The motion is usually represented by a motion vector. Groups of blocks, i.e., macroblocks, may be compared in order to determine a plurality of motion vectors for each P-frame. Note that the search for motion vectors is computationally expensive since a search for an optimum motion vector is performed for each block. At step 150, the motion vectors are used to predict a motion compensated macroblock. At step 160, the motion compensated macroblock is subtracted from a current macroblock to form a residual macroblock. At step 170, the residual macroblock undergoes a transformation, the coefficients of the transformed residual macroblock are quantized, and then losslessly encoded. Since the residual macroblock carries less information than the macroblocks of the original P-frame, there is a reduction in the amount of bits that need to be transmitted to a receiving party.

Typically, a video codec will select every $N^{th}$ frame to encode as an I-frame and the rest to be encoded as P-frames. This duration between I-frames is referred to as an "Intra-period." The presence of an I-frame acts as a reference to refresh the P-frames. Within the designated P-frames, the video codec will also occasionally select certain macroblocks to be Intra-coded, which are not encoded using temporal prediction.

Figure 2:
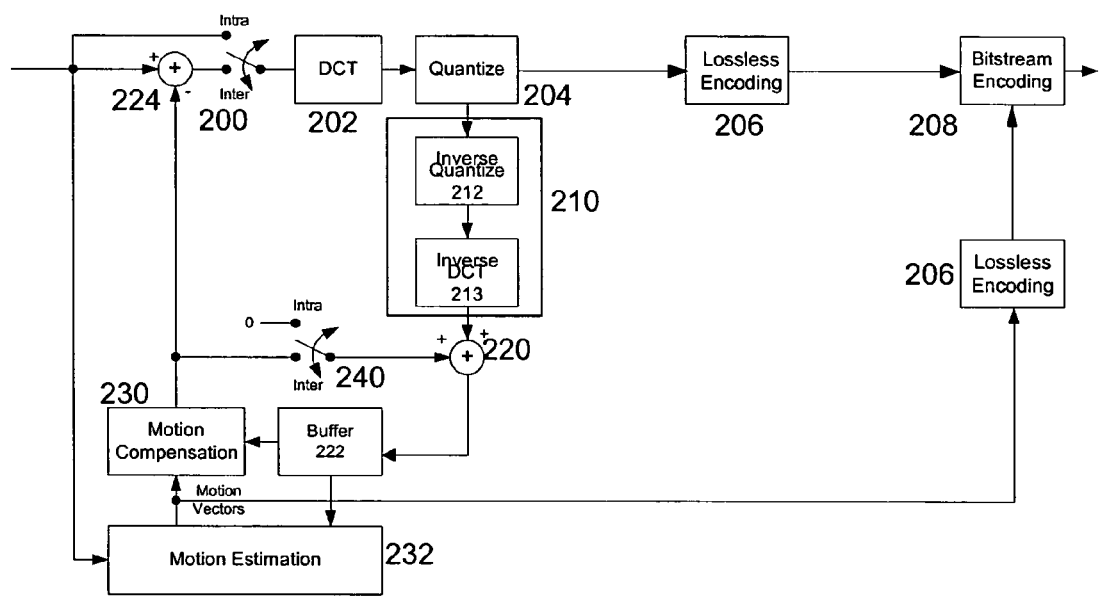
FIG. 2 is a block diagram of a conventional video encoder.

FIG. 2 is a block diagram of the encoding performed by a conventional video codec in an electronic device. The signal path through the codec depends upon whether the input image signal is an I-frame or a P-frame, or alternatively, whether a macroblock within a P-frame is an Intra-MB or an Inter-MB. For illustrative ease, the encoding of a P-frame will be described hereafter using the terminology of Intra-MBs and Inter-MBs. If the input image signal is an Intra-MB, then a switch 200 establishes a signal path through the DCT block 202, the quantizer block 204, and then the lossless coding block 206. The signal leaves the video codec for further processing within the electronic device. An example of further processing is the coding at the bitstream encoding block 208, which encodes the signal in an appropriate transmission format for the transmission medium.

Although the Intra-MB coding is finished at block 204, the Intra-MB needs to be used as a reference MB for the Inter-MB coding. Hence, the quantization values that exit the quantizer block 204 also enter a decoding portion 210 of the video codec. The decoding portion 210 comprises a de-quantizer block 212 and an inverse-DCT block 213. The quantization values pass through the de-quantizer block 212 and then the inverse-DCT block 213 to reconstruct the Intra-MB, which is used to refresh the buffer 222 that is accessed by the motion compensation block 230 and the motion estimation block 232. The path through the DCT block 202, the quantizer block 204, and then the lossless coding block 206 is also applicable for encoding the residual MBs generated by the Inter-MB encoding.

If the input image signal is an Inter-MB, then the switch 200 establishes a new signal path, which includes the motion compensation block 230 and the motion estimation block 232. The motion estimation block 232 receives the current Inter-MB and a set of stored reference MBs from the buffer 222 and performs a search through a plurality of motion vectors for the motion vector that best describes the motion between the current Inter-MB and the reference MB. Note that the reference MB is the stored reconstructed pixels of previous or future MBs that were output from the decoding portion 210 of the video codec. The motion vector is then input into the motion compensation block 230.

The motion compensation block 230 receives the motion vector from the motion compensation block 230 and the reference MB from the buffer 222 in order to generate a new predictive MB from the reference MB, i.e., a predictive version of the current Inter-MB. When Inter-MB coding takes place, the reference MB should be updated. Hence, the switch 240 is "on," so that the predictive MB is added by summing element 220 to the decoded residual MB that is output from the decoding portion 210. The result is stored as a new reference MB in buffer 222.

The predictive MB from the motion compensation block 230 is subtracted from the current Inter-MB by subtraction element 224 in order to form a residual MB. The residual MB is then processed as described above for Intra-MB encoding. The quantized, transformed residual MB is further passed through the decoding portion 210 so that the residual MB may be used by the video codec to update the reference MB stored in the buffer 222, which in turn may be accessed by the motion compensation block 230 and motion estimation block 232 for encoding MBs of future or past frames. Note that predictive coding techniques may be bi-directional, in that past information may be used to predict the current frame or future information may be used to predict the current frame.

The encoding of the Intra-MBs may also use spatial prediction. The encoding of the Inter-MBs employs temporal prediction. The problem with the conventional video codec design of FIG. 2 is that nonpredictive coding consumes too many memory resources and predictive coding consumes too many processing resources. If one of skill in the art decided that lowering the MIPS requirement is needed to perform other tasks, then increasing the number of I-frames or Intra-MBs is a possible solution, which is implemented by decreasing the intra-period value N. However, this solution is flawed because the demand for memory resources would correspondingly increase. Moreover, the overall transmission rate of the video images over a communication channel would increase since more bits are needed to convey spatial information as compared to predictive information. For wireless applications, such as video streaming over cellular phones, the increased transmission bits could result in a degraded synthesized image signal if the wireless or landline communication channel cannot accommodate the increased transmission bit rate.

Conversely, if one of skill in the art decided that memory resources were limited, then one solution is to perform more temporally predictive encoding, which is implemented by increasing the intra-period value N. However, temporally predictive encoding requires more cycles from the processing elements which, if loaded past a maximum threshold, will drop frame processing tasks for tasks with higher priorities. Dropped frames would then degrade the quality of the synthesized image. In addition, the quality of the synthesized signal would also degrade whenever high speed activities occur within the images because the use of too many predictively encoded frames could cause a failure in the motion estimation ability of the video codec.

Hence, an important consideration in the operation of video codecs is the design for determining whether a P-frame MB should be coded as an Intra-MB or an Inter-MB, in addition to making a best prediction mode determination between macroblock size choices. In H.264, for example, nine coding modes for the 4×4 block size and four coding modes for the 16×16 MB exist for Intra-coding. For Inter-MBs, an important consideration in some advanced codecs, such as H.264, is also to make a best prediction mode determination between MB size choices. H.264, for example, supports four coding types, including block sizes of 16×16, 16×8, 8×16, and 8×8 for Inter-MBs.

Traditionally, video codecs made coding mode decisions based upon measurements that are performed upon each MB. Predictive coding involving motion estimation and spatial estimation is very computationally intensive in video codecs because they employ exhaustive searches through multiple coding modes before an optimal mode is selected that achieves the best compression efficiency.

Figure 3:
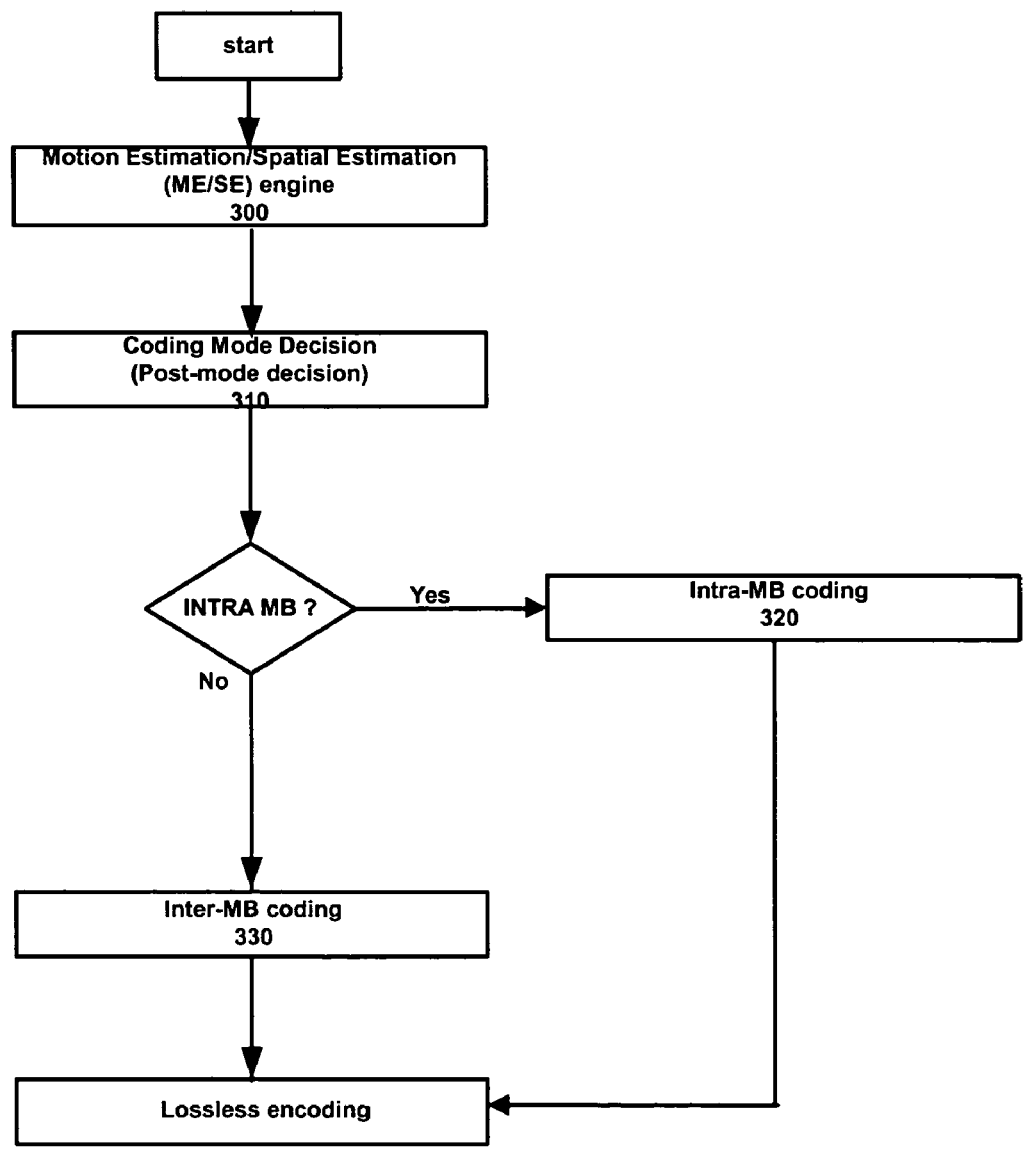
FIG. 3 is an example of a post-mode coding decision algorithm.

FIG. 3 is an example of a coding mode decision algorithm. At step 300, extensive computations are performed to determine a distortion metric or quality measure for each permissible coding mode for each macro-block within a frame by a Motion Estimation/Spatial Estimation (ME/SE) engine. At step 310, the best coding mode is selected for the MB based on the distortion metrics/quality measures of the permissible coding modes. One such quality measure is the Sum of Absolute Difference (SAD) value, which is a distortion metric based upon the absolute difference between a current MB and a MB in a previous frame. Another measure can be the number of bits spent on coding motion vectors and residuals in order to find the coding mode that yields minimum cost.

If the MB is an Intra-MB, then the program flow proceeds to step 320. In H.264, for example, there are nine coding modes for a 4×4 Intra-MB and four coding modes for a 16×16 Intra-MB. For a 4×4 Intra-MB, the nine coding modes are vertical prediction, horizontal prediction, DC prediction, diagonal-down-left prediction, diagonal-down-right prediction, vertical-right prediction, horizontal-down prediction, vertical-left prediction, and horizontal-up prediction. For a 16×16 Intra-MB, the four coding modes are vertical prediction, horizontal prediction, DC prediction, and plane prediction.

If the MB is determined to be an Inter-MB at step 310, then the program flow proceeds to step 330, whereupon the Inter-MB is predictively encoded. In H.264, there are four coding types associated with block sizes of 16×16, 16×8, 8×16, and 8×8.

After either step 320 or step 330, the encoded MB is losslessly encoded in a format appropriate for transmission.

Note that at step 310, the coding mode decision is made after the motion estimation (ME) and/or the spatial estimation (SE) searches. This coding mode decision is implemented by searching through all the possible coding modes exhaustively, and a selection is made after all searches. For this reason, the decision algorithm is categorized as a "post-mode" decision algorithm. Since the post-mode decision algorithm requires ME and/or the SE searches, there is a significant amount of hardware or Digital Signal Processor (DSP) resources that must be consumed in order to perform the algorithm.

The embodiments that are presented herein are for reducing the computational complexity for performing a coding mode decision by reducing the dependence of the coding mode decision on exhaustive SE and ME searches. In one embodiment, a method and apparatus for pre-determining the prediction modes for a proportion of the MBs is presented. This embodiment may be referred to as the pre-mode decision algorithm. In one aspect of this embodiment, past and/or currently available prediction modes are analyzed to determine a prediction mode for a current MB. In another embodiment, the method and apparatus for pre-determining the prediction modes are combined with a post-mode decision to create a hybrid mode decision algorithm.

The underlying basis for spatial estimation and motion estimation is the strong spatial correlation within a particular frame and the strong temporal and spatial correlation between successive frames. The embodiments herein are based on the premise that the best prediction mode for a current MB, as determined by the aforementioned post-mode decision algorithm, will also be strongly correlated to the best prediction modes of other MBs. For example, a relatively flat area in a frame may cause a post-mode decision algorithm to designate a group of MBs as Inter-MBs of dimension 16×16, another group of MBs to be designated as Inter-MBs of dimension 8×8, and another group of MBs to be designated at Intra-MBs of dimension 4×4. Hence, a MB tends to attract the same coding mode designation as other MBs that are spatially/temporally close.

Figure 4A:
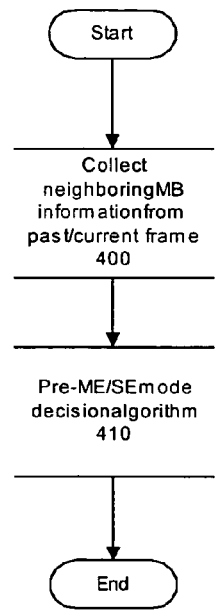
FIG. 4A is a block diagram of a pre-mode decision algorithm embodiment.

FIG. 4A is a block diagram illustrating an embodiment of a pre-mode decision algorithm. At step 400, the video codec evaluates the coding modes of a selection of spatially and/or temporally close MBs, i.e., neighboring MBs, from either a past and/or current frame. At step 410, the codec uses a decision criteria to determine the coding mode of the current MB.

Figure 4B:
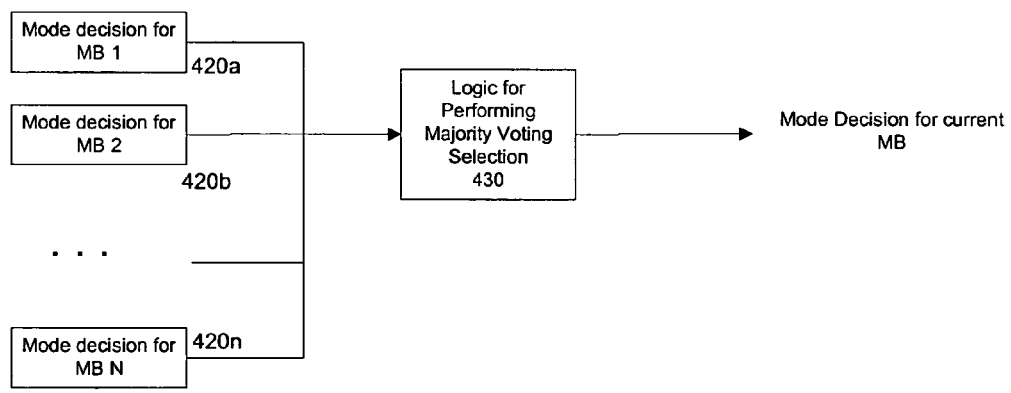
FIG. 4B is a block diagram of a decision criteria that may be implemented in a pre-mode decision algorithm embodiment.

FIG. 4B is a block diagram of a simple decision criteria that may be implemented in an embodiment of the pre-mode decision algorithm. The already formulated mode decisions 420a, 420b, ..., 420n for neighboring MBs, from either a past and/or current frame, are input to a logic that performs a simple majority vote selection 430. The mode decision for the current MB is based upon the outcome of the majority vote of the already formulated mode decisions 420a, 420b, ..., 420n.

In one aspect of the embodiment, the selection of the already formulated mode decisions 420a, 420b, ..., 420n may be performed using an interlaced pattern, so that mode decisions from a past frame may be used with mode decisions from the current frame as candidates for the majority vote selection logic 430. In other words, as an illustrative example, if the MB is located at position (x,y) in a frame T, then mode decisions of MBs at positions (x−1, y), (x+1, y), (x, y−1), and (x, y+1) from frame T, and mode decisions of MBs at positions (x−1, y−1), (x+1, y−1), (x−1, y+1), and (x+1, y+1) from frame T−1 could be selected as input into the majority vote selection logic.

In another aspect of the embodiment, an adaptive interlaced pattern, rather than a fixed interlaced pattern may be used to select candidate MBs. Moreover, different interlacing patterns may be used whenever certain criteria are met. For example, only MBs that meet certain confidence level or exceed certain threshold(s) are used for the pre-mode decision. Such MBs are not necessarily located in a fixed pattern.

In another aspect, the majority vote selection logic may take the modes from all candidate MBs as input and weight each mode according to a weighting factor. For example, the inverse of the spatial and/or temporal distance of a candidate MB from the current MB may be used as a weighting factor to weigh a mode in the majority vote selection.

The pre-mode decision embodiment described above may be improved upon in order to prevent inaccurate mode decision from propagating. The pre-mode decision algorithm may be combined with a post-mode decision algorithm to create a hybrid-mode decision embodiment.

Figure 5A:
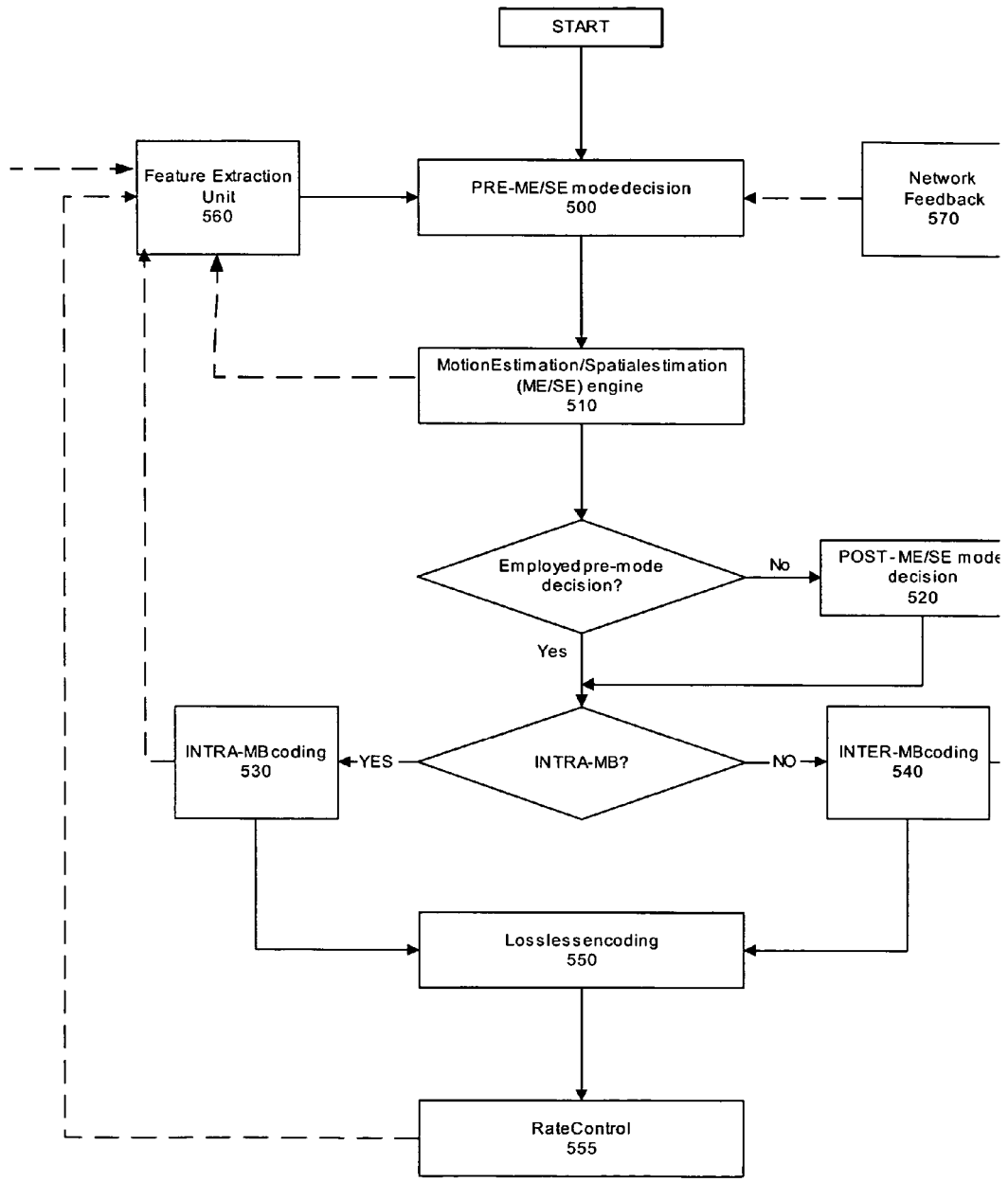
FIG. 5A is a block diagram illustrating a hybrid-mode decision algorithm embodiment.

FIG. 5A is a block diagram illustrating an embodiment of a hybrid-mode decision algorithm.

At step 500, a pre-mode decision is performed for select MBs. The pre-mode decision process is described above for FIGS. 4A and 4B. The methodology for selecting which MBs undergo the pre-mode decision process is described further in relation to FIG. 5B. At step 510, the ME/SE engine performs both exhaustive ME and SE searches for MBs for which pre-mode decisions were not made. At step 520, the best coding mode is selected for the MBs that underwent the motion and spatial estimation searches.

If the MB is an Intra-MB, then the program flow proceeds to step 530.

If the MB is determined to be an Inter-MB, then the program flow proceeds to step 540, whereupon the Inter-MB is predictively encoded.

After either step 530 or step 540, the encoded MB is losslessly encoded at step 550 in a format appropriate for transmission.

Figure 5B:
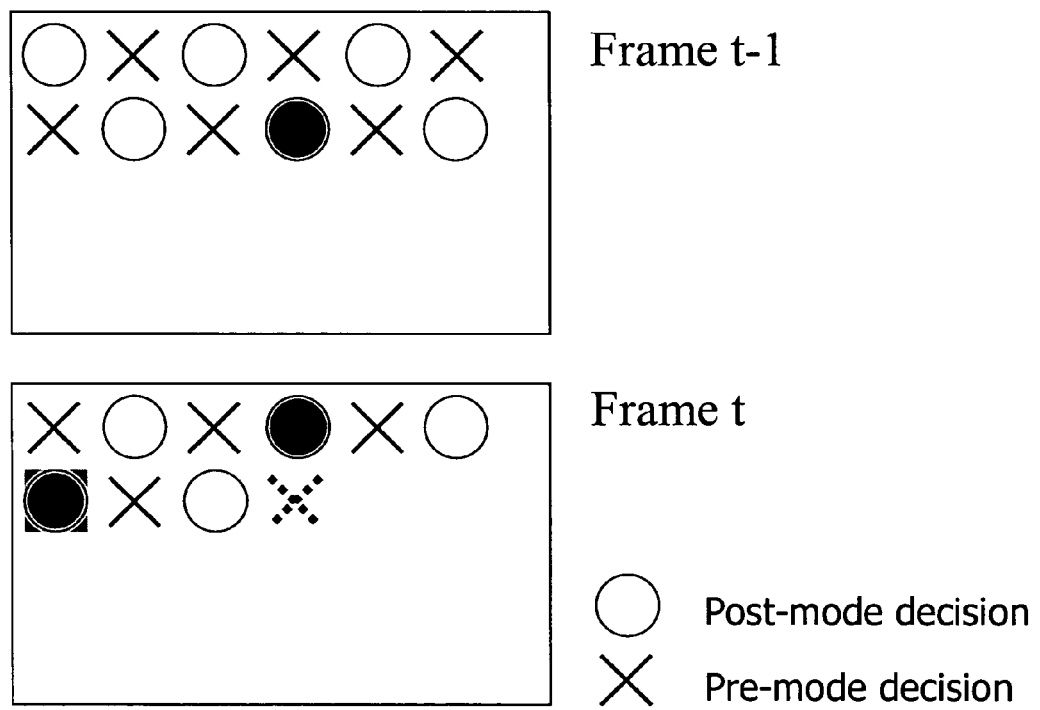
FIG. 5B is a block diagram illustrating an interlacing pattern that may be implemented as a decision criteria in a hybrid-mode decision algorithm embodiment.

FIG. 5B is a diagram that shows how an interlaced pattern may be applied to the hybrid mode decision embodiment of FIG. 5A to determine whether the coding mode of a MB will be determined using a pre-mode decision process or a post-mode decision process.

FIG. 5B is an example of an interlaced pattern where the current MB (marked with a dotted X) is in a position where a pre-mode decision process will be made. The pre-mode decision will be based on the mode decisions already made for the MBs on the shaded positions. In this instance, the pre-mode decision will be based on three candidates that were determined using the post mode decision process for the current frame T and a previous frame T−1. Hence, interlaced patterns may be used to determine whether a pre-mode or a post-mode decision will be made, and the patterns may also be used to determine which candidates to use in the pre-mode decision process.

The interlaced pattern specifically illustrated in FIG. 5B is only one example of the interlaced patterns that may be used in the hybrid mode decision embodiment. The interlaced patterns discussed under the pre-mode decision embodiment may be applied for this embodiment. An adaptive or a fixed interlaced pattern may be used to select MBs to undergo pre-mode decisions rather than post-mode decisions. Moreover, different interlacing patterns may be used whenever certain criteria are met. Note that the use of interlaced patterns of any sort allows the codec to control the number of pre-mode decisions made as opposed to the number of post-mode decisions. If the processing resources are low, for example, when multiple applications are running on the electronic device housing the codec, the codec can be set to reduce the number of post-mode decisions, which correspondingly reduces the number of exhaustive computational searches for the best coding modes. The use of an interlacing pattern that requires fewer post-mode decisions would be useful in this instance.

In another aspect of the hybrid mode embodiment, the decision as to whether a MB undergoes a pre-mode or post-mode decision may be based upon input from a Feature Extraction Unit (Block 560 of FIG. 5A) or upon Network Feedback (Block 570 of FIG. 5A) or upon Rate Control (Block 555 of FIG. 5A). For example, the embodiments may be implemented to accommodate video streams with differing image sizes, bit rates and/or frame rates. In yet another aspect, the embodiments may be implemented to accommodate variable transmission channels that are prone to channel errors. In yet another aspect, the embodiments may be implemented to accommodate a user-defined quality measure. In yet another aspect, the embodiments may be implemented to accommodate a lack of hardware resources. As indicated herein, the embodiments may be used to accommodate many different needs that may originate from different portions of the electronic device that houses the video codec. Configuration signals may originate at any portion of the electronic device or alternatively, the configuration signals may originate from a network that is accessed by the electronic device.

Different embodiments are possible wherein the hybrid mode decision may occur at different levels of the encoding process. In particular, the pre-mode decision may be performed at three different levels. In one embodiment, the pre-mode decision only determines whether a MB should be either intra- or inter-coded, and then leave the submode decision to further searches by the ME/SE engine and the post-mode decision process. In H.264, a submode may refer to one of the nine 4×4 Intra-coding modes, or of the four 16×16 Intra-coding modes, or of the 16×16, 16×8, 8×16, 8×8 Inter-coding modes. In another embodiment, the pre-mode decision first determines one of the following modes for the current MB: intra-4×4, intra-16×16, inter-16×16, inter-16×8, inter-8×16, and inter-8×8, so that the post-mode decision process is only implemented upon the possible submodes of the selected mode. In another embodiment, the pre-mode decision first determines a particular submode, such as, for example, intra-4×4 vertical prediction, so that further SE or ME searches need only to be performed for one particular mode that is already pre-determined.

The embodiments that are described herein are for reducing the computational complexity of the coding process for P-frames and/or I-frames and/or bi-directional frames (B-frames). Reducing the number of exhaustive SE and/or ME searches by exploiting the correlation between coding mode decisions will allow a reduction in the computational complexity (DSP MIPS or hardware power) requirements for the video coding without unduly degrading the perceived quality of the video.

Hardware, such as a digital signal processor or other processing element and memory elements may be configured to execute instructions for performing the method steps described above. Such hardware may be easily implemented in any of the currently existing video codecs compliant to the standards of MPEG, ITU-T H.26x, or AVS.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of computer-readable storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. Method for making a coding mode decision for a current macroblock of a video frame in a video codec of an electronic device, the method comprising:
   determining, via the video codec, whether to use a pre-mode decision process or a post-mode decision process in making the coding mode decision based on a position of the current macroblock within the video frame relative to a pattern of macroblock positions defined for the video frame, wherein the pre-mode decision process occurs prior to motion estimation and spatial estimation and wherein the post-mode decision process occurs after motion estimation and spatial estimation;
   if the pre-mode decision process is determined to be used, then
      evaluating, via the video codec, a plurality of coding modes without performing motion estimation and spatial estimation, wherein each of the plurality of coding modes is associated with a neighboring macroblock; and
      selecting, via the video codec, the coding mode for the current macroblock based upon the evaluation of the plurality of coding modes; and
   if the post-mode decision process is determined to be used, then
      extracting, via the video codec, a quality measure from the current macroblock following motion estimation and spatial estimation; and
      selecting, via the video codec, the coding mode for the current macroblock based upon the quality measure.

2. The method of claim 1, wherein evaluating, via the video codec, the plurality of coding modes comprises:
   selecting, via the video codec, the plurality of coding modes in accordance with a configuration signal originating from a video codec.

3. The method of claim 1, wherein evaluating, via the video codec, the plurality of coding modes comprises:
   selecting, via the video codec, the plurality of coding modes in accordance with a configuration signal originating from an electronic device housing a video codec.

4. The method of claim 1, wherein evaluating, via the video codec, the plurality of coding modes comprises:
   selecting, via the video codec, the plurality of coding modes in accordance with a configuration signal originating from a network resource.

5. The method of claim 1, further comprising if the pre-mode decision process is determined to be used:
   selecting, via the video codec, the coding mode based at least in part on other macroblocks within the video frame that used a post-mode selection process.

6. The method of claim 1, wherein the pattern of macroblock positions comprises an interlaced pattern of macroblock positions.

7. The method of claim 1, wherein the pattern of macroblock positions comprises an adaptive pattern of macroblock positions.

8. The method of claim 1, wherein, if the pre-mode decision process is determined to be used, selecting, via the video codec, the coding mode for the current macroblock comprises:
   using a majority rule selection criteria to select, via the video codec, the coding mode for the current macroblock.

9. The method of claim 8, wherein using a majority rule selection criteria to select, via the video codec, the coding mode for the current macroblock comprises:
   using weights, via the video codec, with the majority rule selection criteria.

10. The method of claim 1, further comprising if the pre-mode decision process is determined to be used:
   extracting features from the video frame, via the video codec; and
   selecting, via the video codec, the coding mode for the current macroblock based upon the evaluation of the plurality of coding modes and the extracted features from the video frame.

11. Apparatus for performing a coding mode decision for a current macroblock of a video frame, the apparatus comprising:
   at least one memory element; and
   at least one processing element communicatively coupled to the at least memory element and configured to implement a set of instructions stored on the at least one memory element, the set of instructions for:
   determining whether to use a pre-mode decision process or a post-mode decision process in making the coding mode decision based on a position of the current macroblock within the video frame relative to a pattern of macroblock positions defined for the video frame, wherein the pre-mode decision process occurs prior to motion estimation and spatial estimation and wherein the post-mode decision process occurs after motion estimation and spatial estimation;
   if the pre-mode decision process is determined to be used, then
      evaluating a plurality of coding modes without performing motion estimation and spatial estimation, wherein each of the plurality of coding modes is associated with a neighboring macroblock; and
      selecting the coding mode for the current macroblock based upon the evaluation of the plurality of coding modes; and
   if the post-mode decision process is determined to be used, then
      extracting a quality measure from the current macroblock following motion estimation and spatial estimation; and
      selecting the coding mode for the current macroblock based upon the quality measure.

12. The apparatus of claim 11, wherein the at least one processing element comprises a voting logic for selecting the coding mode if the pre-mode decision process is determined to be used.

13. The apparatus of claim 11, wherein the apparatus comprises a video codec that is an MPEG-compliant codec.

14. The apparatus of claim 11, wherein the apparatus comprises a video codec that is an ITU-T H.26x series-compliant codec.

15. The apparatus of claim 11, wherein the apparatus comprises a video codec that is an AVS-compliant codec.

16. The apparatus of claim 11, wherein the apparatus comprises a video codec that is a hybrid codec that uses temporal and spatial prediction and uses both Intra and Inter modes.

17. The apparatus of claim 11, wherein the pattern of macroblock positions comprises:
   an interlaced pattern of macroblock positions.

18. The apparatus of claim 11, wherein the pattern of macroblock positions comprises:
   an adaptive pattern of macroblock positions.

19. The apparatus of claim 11, wherein, in evaluating a plurality of coding modes, the at least one processing element is further configured to execute a set of instructions for:
   selecting the plurality of coding modes in accordance with a configuration signal originating from a video codec.

20. The apparatus of claim 11, wherein, in evaluating a plurality of coding modes, the at least one processing element is further configured to execute a set of instructions for:
   selecting the plurality of coding modes in accordance with a configuration signal originating from an electronic device housing a video codec.

21. The apparatus of claim 11, wherein, in evaluating a plurality of coding modes, the at least one processing element is further configured to execute a set of instructions for:
   selecting the plurality of coding modes in accordance with a configuration signal originating from a network resource.

22. The apparatus of claim 11, wherein, in evaluating a plurality of coding modes, the at least one processing element is further configured to execute a set of instructions for:
   selecting the plurality of coding modes based at least in part on past mode decisions.

23. The apparatus of claim 11, wherein, if the pre-mode decision process is determined to be used, the at least one processing element is further configured to execute a set of instructions for:
   using a majority rule selection criteria to select the mode decision for the current macroblock.

24. The apparatus of claim 11, wherein, if the pre-mode decision process is determined to be used, the at least one processing element is further configured to execute a set of instructions for:
   extracting features from the video frame; and
   selecting the coding mode for the current macroblock based upon the evaluation of the plurality of coding modes and the features from the video frame.

25. A non-transitory storage medium comprising executable instructions for determining a coding mode for a macroblock in a video frame, said executable instructions being executable by hardware and comprising instructions that:
   determine whether to use a pre-mode decision process or a post-mode decision process based on a position of the current macroblock within the video frame relative to a pattern of macroblock positions defined for the video frame, wherein the pre-mode decision process occurs prior to motion estimation and spatial estimation and wherein the post-mode decision process occurs after motion estimation and spatial estimation;
   determine the coding mode for the macroblock based on a plurality of coding modes without performing motion estimation and spatial estimation, wherein each of the plurality of coding modes is associated with one of a plurality of neighboring macroblocks, if the pre-mode decision process is determined to be used; and
   determine the coding mode for the macroblock based on a quality measure of the coding mode following motion estimation and spatial estimation if the post-mode decision process is determined to be used.

26. The non-transitory storage medium of claim 25, wherein the neighboring macroblocks are either from a current video frame or from a past video frame.

27. The non-transitory storage medium of claim 25, wherein if the pre-mode decision process is determined to be used, the instructions that determine the coding mode for the macroblock comprise instructions that use decision criteria on the coding modes of the neighboring macroblocks.

28. The non-transitory storage medium of claim 25, wherein if the post-mode decision process is determined to be used, the instructions that determine the coding mode for the macroblock comprise instructions that determine a quality measure for each of the plurality of coding modes.

29. An apparatus for determining a coding mode for a macroblock in a video frame, comprising:
- means for determining whether to use a pre-mode decision process or a post-mode decision process based on a position of the current macroblock within the video frame relative to a pattern of macroblock positions defined for the video frame, wherein the pre-mode decision process occurs prior to motion estimation and spatial estimation and wherein the post-mode decision process occurs after motion estimation and spatial estimation;
- means for determining the coding mode for the macroblock based on a plurality of coding modes without performing motion estimation and spatial estimation, wherein each of the plurality of coding modes is associated with one of a plurality of neighboring macroblocks, if the pre-mode decision process is determined to be used; and
- means for determining the coding mode for the macroblock based on a quality measure of the coding mode following motion estimation and spatial estimation if the post-mode decision process is determined to be used.

30. The apparatus of claim 29, wherein the neighboring macroblocks are either from a current video frame or from a past video frame.

31. The apparatus of claim 29, wherein the means for determining the coding mode for the macroblock if the pre-mode decision process is determined to be used comprises means for using decision criteria on the coding modes of the neighboring macroblocks.

32. The apparatus of claim 29, wherein the means for determining the coding mode for the macroblock if the post-mode decision process is determined to be used comprises means for determining a quality measure for each of the plurality of coding modes.

33. An apparatus for determining a coding mode for a macroblock in a video frame, comprising:
- at least one processor configured to determine whether to use a pre-mode decision process or a post-mode decision process based on a position of the current macroblock within the video frame relative to a pattern of macroblock positions defined for the video frame, wherein the pre-mode decision process occurs prior to motion estimation and spatial estimation and wherein the post-mode decision process occurs after motion estimation and spatial estimation, determine the coding mode for the macroblock based on a plurality of coding modes without performing motion estimation and spatial estimation, wherein each of the plurality of coding modes is associated with one of a plurality of neighboring macroblocks, if the pre-mode decision process is determined to be used, and determine the coding mode for the macroblock based on a quality measure of the coding mode following motion estimation and spatial estimation if the post-mode decision process is determined to be used; and
- a memory coupled to the at least one processor.

34. The apparatus of claim 33, wherein the neighboring macroblocks are either from a current video frame or from a past video frame.

35. The apparatus of claim 33, wherein the at least one processor is configured to use decision criteria on the coding modes of the neighboring macroblocks if the pre-mode decision process is determined to be used.

36. The apparatus of claim 33, wherein the at least one processor is configured to determine a quality measure for each of a plurality of coding modes available for the macroblock if the post-mode decision process is determined to be used.

37. The method of claim 1, wherein different video frames define different patterns of macroblock positions.

* * * * *